Jan. 4, 1949.　　　　E. A. DERUNGS　　　　2,457,876
SELECTING CONTROL DEVICE

Filed Oct. 27, 1943　　　　　　　　　　　　2 Sheets-Sheet 1

Inventor
E. A. Derungs

Jan. 4, 1949. E. A. DERUNGS 2,457,876
SELECTING CONTROL DEVICE
Filed Oct. 27, 1943 2 Sheets-Sheet 2

Inventor
E. A. Derungs
By Glascock Downing & Seebold
Attys

UNITED STATES PATENT OFFICE 2,457,876

SELECTING CONTROL DEVICE

Ernest Alphonse Derungs, Le Locle, Switzerland

Application October 27, 1943, Serial No. 507,853
In Switzerland October 9, 1942

Section 1, Public Law 690, August 8, 1946
Patent expires October 9, 1962

17 Claims. (Cl. 74—335)

Object of the present invention is a selecting control device particularly but not exclusively for machines such as motor cars and other motor vehicles having a gear box with change speed gears. The control device is destined for the remote control of these change speed gears or similar organs in order to give the machine different speeds for a given number of revolutions of the motor.

The selecting control device according to the invention is characterised in that it comprises three groups of organs, a first one, mounted on a stationary part, for imparting to the organs of the second, movable group different positions which are transmitted to the third group of organs, mounted on a stationary part and acting upon the change speed gears for intercalating the speed selected by means of the organs of the first group.

In a preferred embodiment of the selecting control device, the organs of the second group execute an alternating, rectilinear translatory motion relatively to the first group comprising the means provoking the said movement. The second group has selecting cams of a number equal to that of the change speed gears. These cams are pivoted on a movable member and are displaced in the one or the other direction by pushers forming part of the first group and against which the selecting cams are returned. As, in certain gear boxes for vehicles, it is important that only one change speed gear can be operated at a time, a special locking device can be provided in a preferred embodiment so that, whatever the number of selecting cams of the control device may be, it is impossible to displace more than one cam at a time and, when a cam is already in working position, also impossible to displace any of the other cams.

The accompanying drawings illustrate, by way of example only, an electrically controlled embodiment of the selecting control device according to the invention.

Figure 1:
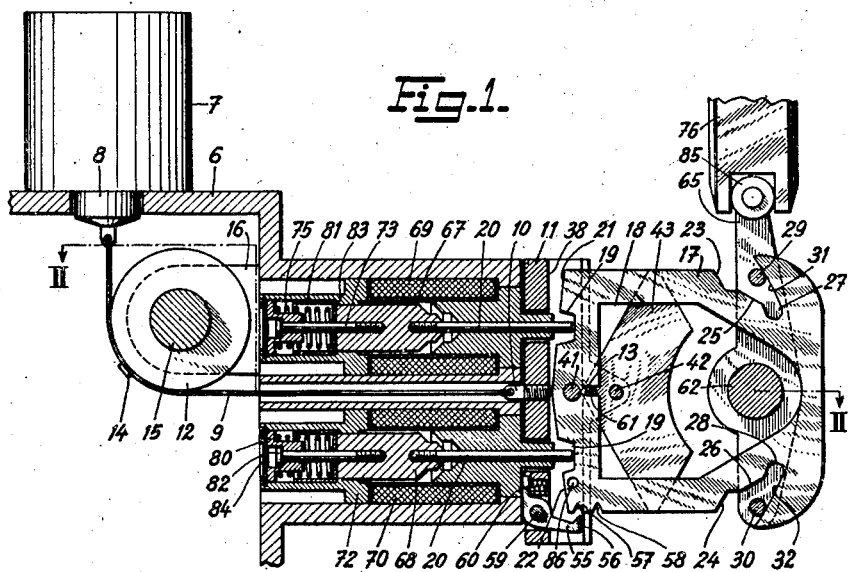
Fig. 1 is a partial section along the line I—I of Fig. 2 which is a horizontal section along line II—II of Fig. 1.
Figure 2:
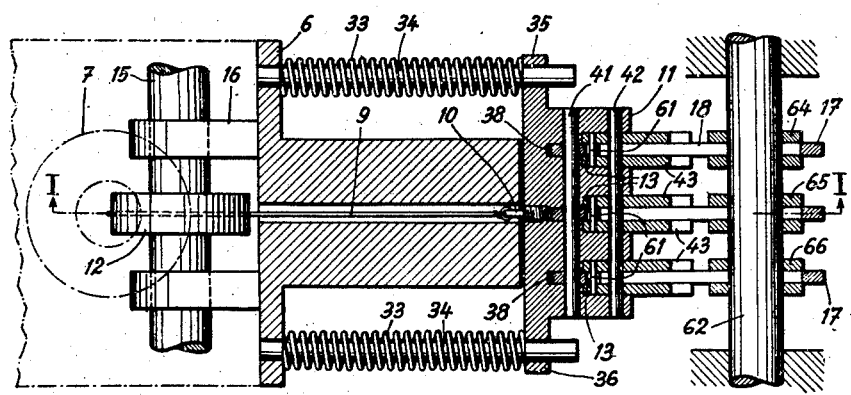
Figure 3:
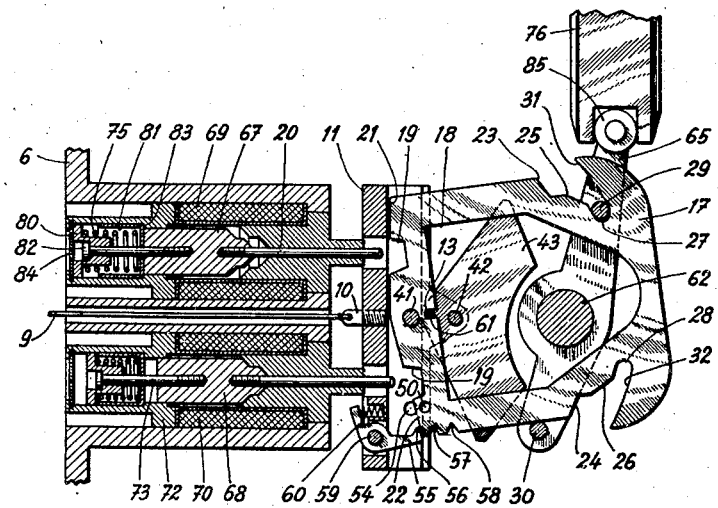
Fig. 3 is a view analogous to that in Fig. 1 but in another working position.

Referring now to Figs. 1 to 3, to the base 6 an electromagnet 7 is fixed whose movable core 8 is connected to an attachment 10 by a pull member 9, the device 10 being fixed to a movable member 11. The member 9 runs over a roller 12 to which it is fixed by a pin 14. The roller 12 is carried by a shaft 15 pivoted on the bearings 16 fixed to the base 6. Selecting cams 17 enter grooves 38 of the movable member 11, these cams having openings 18 and cut-outs 19 corresponding to pushers 20. The cams 17, besides, comprise two catches 21 and 22 which, when the cams are inclined in the one or the other direction, bear against the movable member 11. Furthermore, each selecting cam 17, on both sides, has shoulders 23 and 24 lengthened by the inclined surfaces 25, 26 forming one of the walls of the grooves 27, 28 in which the pins 29 and 30 are displaced. The other wall of the grooves is constituted by arc-shaped surfaces 31 and 32 with their centre in the centre of rotation of the selecting cams.

The movable member 11 is under the influence of two compression springs 33 surrounding the guide rods 34 traversing ears 35 and 36 of the member 11 and being fixed to the base 6 (Fig. 2). The selecting cams 17 entering the grooves 38 of the movable member 11 pivot around an axle 41 traversing member 11. A pin 42 forms the axle for balance weights 43 disposed on each side of the selecting cams 17.

The balance weights 43 of each selecting cam 17 are interconnected by pins 61 traversing cut-outs 13 of the cams 17.

The control device of the non-illustrated machine to which belongs the selecting control device possesses transmission levers 64, 65, 66 all of which pivot around an axle 62, the heads 85 of these levers engaging forks 76 forming part of the control means for the change speed gears.

Pins 29 and 30 entering the grooves 27, 28 of the cams 17 are fixed to these transmission levers 64, 65, 66.

The illustrated selecting control device comprises two locking devices. The first one (Fig. 5) is constituted by two groups of cylinders 48 and 52 respectively and balls 47, 49 and 51, 53 respectively, these groups being separated from each other by a cylinder 50 of smaller diameter. The whole is placed in a bore 54 traversing the movable member 11 and the selecting cams 17. The manner of operation of this locking device is described later on.

The second locking device has a pawl 55 oscillating about an axle 59 and ending in a nose 56 which in Fig. 1 lies in front of a notch 57 of the selecting cam 17, this notch corresponding to the neutral position of the cam 17. The notch 58 of this same selecting cam corresponds to one of its working positions while, for the other working position, the nose 56 bears against the catch 22 (Fig. 3). Each pawl is under the influence of a spring 60.

The base 6 is fixed. It carries three selecting cams 17 each operated by a set of means described later on. Only the set belonging to one cam 17 is described, the sets of the other cams being identical.

These sets, belonging to the first group of organs, comprise two pushers 20 lying in front of the cut-outs 19 of the selecting cams 17. These pushers are fixed to the movable cores 67 and 68 of small electromagnets 69 and 70 operating them. The movable cores 67, 68 are supported on elastic stops each comprising a rod 73 fixed to the movable cores. Furthermore, for each electromagnet a spring 75 is compressed between the bottom of a sleeve 81 supported on a shoulder 83 of the fixed part 72 of the electromagnets and a socket 80 held in place by the head 82 of the rod 73.

All these pieces lie in a cylindrical hole of the fixed part 72 of the electromagnets. The shoulder 83 and the disc 84 limit the possibilities of displacement of the parts 80, 81.

*Operation*

In the described example it is a question of displacing three change speed gears of a vehicle gear box, the change speed gears being controlled by levers ending in the forks 76.

The series of operations produced by the selecting control device is as follows:

1. Annulment of all preceding positions of the cams,
2. Putting the cams into the positions according to the disposition of the remote control, under the control of a first locking device,
3. Closing a second locking device of each cam,
4. Actuating the control levers for the change speed gears according to the disposition given to the selecting cams by the remote control.

Displacing each of the change speed gears in the one or the other direction is accomplished by the movements of the cylindrical head 85 according as the corresponding lever 64, 65 or 66 oscillates in the one or the other direction; each change speed gear is disengaged when the forks 76 are in the middle of their movement. When all change speed gears are disengaged, the gear box is on the neutral point, that is, out of operation; this occurs every time the electro-magnet 7, acting by its movable core 8 upon the member 9 and the attachment 10, attracts all selecting cams 17 by means of the movable member 11, that is, when the return movement of the latter takes place.

The return motion to the neutral position of the levers 64, 65, 66 takes place because, whatever the position of the selecting cams may be, the arc-shaped surfaces 31 and 32, whose centre lies in that of the axle 41, bring the pins 29 and 30 back into the position shown in Fig. 1.

In proportion as the movable member 11 approaches the base 6 the cams 17 come into contact with the pushers 20. At the same time the pawl 55 bears against the base 6 and takes the position shown in Fig. 1. All selecting cams 17 are released and can take the position determined by the respective position of the pushers 20.

At the same time when the electromagnet 7 was excited, these pushers 20 have likewise been brought into place by one of the electromagnets 69, 70 controlling the movable cores 67, 68.

When the electromagnets 69, 70 are not excited, the movable cores 67, 68 are in the middle of their stroke. To this effect and for each core the sleeve 81 bears against the shoulder 83 under the pressure of spring 75 which presses the socket 80 against the head 82. In this position there is no play between the head of the rod 73 supported on the socket 80 and the end face of the movable core 67 or 68 respectively making contact with the bottom of the sleeve 81.

If, for instance, the electromagnet 70 of a cam 17 is excited, the movable core 68 takes the position represented in Fig. 3, moving by means of the head of the rod 73 the socket 80 which compresses the spring 75 while a space is formed between the bottom of the sleeve 81 and the end of the movable core 68.

As soon as the excitation of the electro-magnet 70 ceases, the spring 75 moves the socket 80 back towards the disc 84, these pieces, therefore, take again the position shown in Fig. 1. From this it results that, as soon as the excitation of the electromagnets 69, 70 ceases, the movable cores 67, 68 are immediately brought back to their middle position, which is always exactly the same and identical for all movable cores.

This elastic set operates also in the inverse sense. If, for instance, in the position shown in Fig. 3 and on excitation of magnet 7, the upper pusher 20 receives a shock from the corresponding cam 17, it is driven back by this cam 17 moving to the left, because the lower pusher 20 is in an advanced position and thereby forces the cam 17 to remain in the oblique position shown in Fig. 3. On this occasion the upper pusher 20 drives the movable core 67 back which, in its turn, moves the sleeve 81 to the left; this sleeve presses the spring 75 against the socket 80 and the disc 84 while the head 82 of the rod 73 advances in the space provided on the socket 80. The member 11 being now in its outermost left-hand position the change speed gear belonging to lever 65 is disengaged. If this same change speed gear is to be reengaged, the excitation of magnet 7 only must be removed, the member 11 then goes back to the right, the position of the whole as shown in Fig. 3 being thereby reestablished.

If, however, the speed belonging to lever 65 should not only be annulled, but the speed belonging to lever 66 established, the excitation of magnet 70 belonging to lever 65 is removed and magnet 70 belonging to lever 66 excited, so that, on the member 11 moving to the left, cam 17 of lever 65 is brought into the position shown in Fig. 1 and cam 17 of lever 66 into the inclined position illustrated in Fig. 3. Now, the speed belonging to lever 65 is annulled and when the excitation of magnet 7 is removed the change speed gear for the speed belonging to lever 66 is engaged, that is, a new speed is established.

Figure 5:
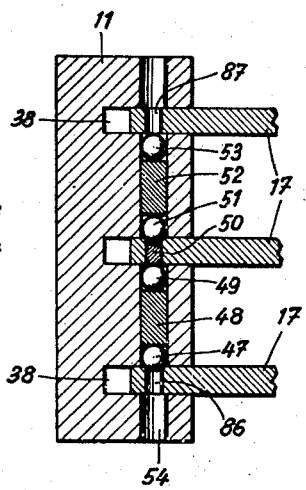
Fig. 5 is a section through a locking device on a greater scale.

When the cam 17 belonging to lever 66 has been brought into the inclined position shown in Fig. 3 the cams belonging to the other levers 64 and 65 have been locked by the device shown in Fig. 5 in the following manner:

The hole 86 of reduced diameter provided on the cam 17 belonging to lever 66 is displaced with regard to the ball 47, driving this latter back. Ball 47 thereby moves cylinder 48 and ball 49 towards the top so that the latter enters the hole of reduced diameter in the middle cam 17 and pushes cylinder 50 back. In this way the middle cam 17 is locked and the ball 51, the cylinder 52 and the ball 53 displaced towards the top, ball 53 thereby entering the hole 87 of reduced diameter in the upper cam 17 and locking the latter.

Thus only the lowermost cam 17 belonging to lever 66 was allowed to take the inclined position shown in Fig. 3, while the two others are in the middle position shown in Fig. 1 which corresponds to the disengaged position of the respective change speed gears.

If, by accident, two electromagnets belonging to two different selecting cams 17 were simultaneously excited, neither the one nor the other of these cams could completely take its active position because the play provided between the holes 86 and 87 and the balls 47 and 53 is just sufficient for the displacement of only one of the cams with regard to the axis of the hole 54. In this case, therefore, no speed would be established because, no operation of pawl 55 being possible, the cams would remain free to slide with their surfaces 25, 26 along the pins 29 and 30, thereby moving into their neutral position. In order that a speed may be established by one of the levers 64, 65, 66 the cam belonging to it must take a complete inclined position and must be maintained in this position by the pawl 55, whose action is as follows: The electromagnet 7 being no longer excited, the springs 33 which have been compressed during the attraction of the movable member 11, move the latter towards the right and the pawl 55, moved in the anticlockwise direction by the spring 60 engages one of the notches 57 or 58 or even, as represented in Fig. 3, the catch 22 of the cam 17. The notch 57 corresponds to the neutral, the notch 58 and the catch 22 to one of the active positions of the selecting cam 17. The current of the electromagnet 70 is only interrupted after the locking has taken place.

If one of the selecting cams 17 has taken an inclined position e. g. that shown in Fig. 3 that is, if a new speed is to be established by displacing the fork 76 of one of the change speed gears e. g. by means of the lever 65, the operation of the latter takes place as follows: The pin 29 having been since the beginning of the movement of the cam on the bottom of the groove 27, is taken along by the cam while the pin 30 can freely leave the other groove 28.

The change speed gears of the other speeds remain in their neutral position owing to the fact that the corresponding selecting cams being in their median position can freely pass between the pins 29 and 30 until their shoulders 23, 24 strike against the latter.

Until the next excitation of the electromagnet 7, the springs 33 maintain all the control levers 64, 65, 66 of the change speed gears in their respective positions by pressing the selecting cams 17 against the pins of the levers 64, 65, 66 both for the neutral position and the working position.

The balance weights 43 serve for the static balancing of the selecting cams in the period between the moment when the cams leave the pushers 20 and the moment of locking by the pawl 55. The cams are pivoted on the axle 41 and the balance weights 43 on the axle 42.

While the balance weights 43 to which the pins 61 are fixed tend to rotate the selecting cams in one direction by pressing upon the upper rim of the notch 13, the same cam is under the influence of its own weight in a direction opposite to the effect of the corresponding balance weight. The moment exerted upon the selecting cam caused by its own weight and that caused by the corresponding balance weight having the same amount, the cam is always in indifferent equilibrium both under the effect of gravitation and of a shock imparted to the cam.

Figure 4:
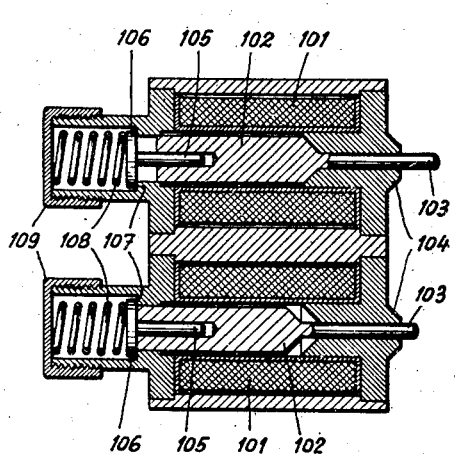
Fig. 4 illustrates a modified detail of the first group of organs.

In Fig. 4 another arrangement of the first group of organs is shown. 101 designates the coils of electromagnets, the inner, movable cores 102 of which are guided, on the one side, by the pushers 103 slidably arranged in a part of the armature 104, and, on the other side, by guides 105 whose head 106 is pressed against a shoulder 107 of the armature 104 by a spring 108. The latter is held in place in a tubular lengthening by means of the threaded cap 109. The parts are represented in the position occupied by the cores when the upper one is attracted. The upper pusher 103 has acted upon the corresponding selecting cam 17 in order to force the lower pusher 103 back against the spring 108. As soon as the electric current is interrupted, the lower spring which is compressed acts upon the lower core to bring it back into the position which it occupies when the head 106 bears against the shoulder 107. Both cores being then in this position, the selecting cam 17 is in its neutral position.

What I claim is:

1. In a selecting control device, control means for change speed gears, a stationary part, a first group of members mounted on said stationary part, a second group of members movable into different positions by said first group, said first group including driving means for effecting alternating rectilinear translatory movement of said second group relatively to the first group for moving the members of said second group into any one of the different positions thereof on the meeting of said second group with said first group at the end of the alternating rectilinear movement of said second group, and a third group of members movable by and in dependence upon the positions of said second group to actuate said control means.

2. In a selecting control device, control means for change speed gears, a stationary part, a first group of members mounted on said stationary part, a second group of members including a movable member, selecting cams pivoted on said movable member and movable into different positions, said first group of members including means effecting alternating rectilinear translatory movement of the second group and for moving said cams into any one of the different positions thereof on the meeting of said second group with said first group at the end of the alternating rectilinear movement of said second group, and a third group of members movable by and in dependence upon the position of said cams to actuate said control means.

3. A device as claimed in claim 2 wherein said cams are provided with grooves having portions of the walls thereof disposed concentric with the pivotal axis of the cams, the members of the third group having portions engaged in said grooves.

4. In a selecting control device, control means for change speed gear, a stationary part, a first group of members mounted on said stationary part, a second group of members, said second group including a movable member and selecting cams pivoted on the movable member and movable into different positions, said cams having grooves therein, said first group of members including driving means for effecting rectilinear movement of the second group of members and for moving the selecting cams into different positions, a third group of members including parts engaged in said grooves and movable by and in dependence upon the positions of the cams to actuate said control means, portions of the grooves in said cams being curved concentrically with the pivotal axis of the cams whereby said cams may move into the different positions thereof, other portions of the walls of said grooves cooperating with the members of the third group for imparting movement thereto.

5. A device as claimed in claim 4 wherein the members of the third group are constituted by pivoted levers carrying said groove engaging parts.

6. A device as claimed in claim 4 wherein said third group of members is constituted by levers pivotally movable about an axis, said groove engaging parts being carried by said levers and constituted by pins thereon.

7. A device as claimed in claim 4 characterized by the provision of balance weights coacting with said pivoted cams.

8. A device as claimed in claim 4 characterized by the provision of means effective to prevent movement of all cams except the one disposed in operative position.

9. A device as claimed in claim 4 wherein said movable member and cams are provided with passages movable into registration and members movable in said passages and effective upon movement of one of the cams to operative position to lock the other cams against movement.

10. A device as claimed in claim 4 wherein the movable member and cams are provided with passages movable into registration, a series of spherical and cylindrical members arranged in alternating succession in said passages and operable when one of said cams is moved to operative position to lock the remaining cams against movement.

11. A device as claimed in claim 4 characterized by the provision of locking means engageable with each cam to maintain the latter in a predetermined position and disengageable from the cam in a certain position of said movable member.

12. A device as claimed in claim 4 characterized by the provision of spring control locking means engageable with each cam to maintain the latter in a predetermined position and disengageable from the cam in a certain position of said movable member.

13. A device as claimed in claim 4 wherein said first group of members includes abutment-like parts adjustably mounted and operable to determine the position of said cams.

14. A device as claimed in claim 4 wherein said first group of members includes pushers for determining the positions of the selecting cams in one position of said movable member, and means normally maintaining said pushers in an intermediate position.

15. A device as claimed in claim 4 wherein the first group of members includes electromagnetically actuated pushers movable into different positions to determine the positions of the cams.

16. A device as claimed in claim 4 wherein said first group of members includes electromagnetic means for actuating the movable member.

17. A device as claimed in claim 4 wherein said first group of members includes combined electromagnetic and spring means for actuating the movable member.

ERNEST ALPHONSE DERUNGS.

REFERENCES CITED

The following references are of record in the file of this patent:

UNITED STATES PATENTS

| Number | Name | Date |
| --- | --- | --- |
| 1,164,080 | Fekete | Dec. 14, 1915 |
| 1,411,748 | Schmidt | Apr. 4, 1922 |
| 1,591,960 | Broders | July 13, 1926 |
| 1,640,872 | Balzer et al. | Aug. 30, 1927 |
| 1,975,060 | Flanders | Sept. 25, 1934 |
| 1,997,841 | Twamley | Apr. 16, 1935 |

FOREIGN PATENTS

| Number | Country | Date |
| --- | --- | --- |
| 57,171 | Denmark | Jan. 15, 1940 |
| 97,869 | Sweden | Nov. 23, 1939 |
| 48,639 | Netherlands | June 15, 1940 |